United States Patent [19]

Jelinek

[11] 4,397,446
[45] Aug. 9, 1983

[54] INTEGRAL SEAL

[75] Inventor: Jerry G. Jelinek, La Habra, Calif.

[73] Assignee: Parker-Hannifin Corporation, Cleveland, Ohio

[21] Appl. No.: 844,867

[22] Filed: Oct. 25, 1977

[51] Int. Cl.³ .............................................. F16K 5/18
[52] U.S. Cl. ..................................... 251/309; 251/317
[58] Field of Search ............... 251/309, 310, 314, 317, 251/357, DIG. 1, 283, 315; 137/625.47

[56] References Cited

U.S. PATENT DOCUMENTS

| | | | |
|---|---|---|---|
| 2,290,349 | 7/1942 | Ohls | 251/317 |
| 2,310,583 | 2/1943 | Johnson | 251/317 |
| 2,547,116 | 4/1951 | Gould | 251/309 |
| 2,943,838 | 7/1960 | Skei | 251/317 |
| 3,108,779 | 10/1963 | Anderson | 251/317 |
| 3,184,215 | 5/1965 | Anderson | 251/317 |
| 3,325,141 | 6/1967 | Skendrovic | 251/317 |
| 3,360,236 | 12/1967 | Hulslander | 251/317 |
| 3,426,795 | 2/1969 | Muller | 251/310 |
| 3,497,179 | 2/1970 | Smyers, Jr. | 251/175 |

Primary Examiner—Martin P. Schwadron
Assistant Examiner—J. R. Shay
Attorney, Agent, or Firm—James A. Baker

[57] ABSTRACT

A sealing sleeve for a rotary type valve is disclosed. The sealing sleeve is formed into a generally circular configuration and is disposed between the housing and the rotor of the valve to provide a firm seal therebetween. Apertures are provided in the periphery of the sleeve and are positioned therein to align with the rotor bores. The inner surface of the sleeve has a thin layer of elastomeric material chemically bonded thereto which terminates in a bead-like configuration about each aperture and on the interior thereof. This bead-like configuration provides a firm seal between the rotor bore and the housing ports eliminating the necessity of O-rings therebetween.

1 Claim, 6 Drawing Figures

INTEGRAL SEAL

BACKGROUND OF THE INVENTION

1. Field of the Invention

This invention relates to a seal for a valve and more particularly to a seal which is integral with a wrap-around liner that surrounds the rotor in a multiported rotary type valve.

2. Description of the Prior Art

Rotary type valves (also commonly known as plug valves) have a relative simple design since they require only a housing, a rotor contained within the housing, and a means for rotating the rotor relative to the housing so as to align the rotor bore with the ports contained within the housing. This simple design, however, involves a complex sealing problem between the rotor and the housing. The prior art uses various approaches to minimize the leakage between the rotor and the housing such as precision machining the mating surfaces of the rotor and the housing to ensure a tight fit therebetween. Such precision machining is very expensive and the resulting close tolerances on the mating surfaces cannot be held because of wear with continued use of the valve. An alternate approach is to fit O-rings into complex machined dovetail grooves within the rotor. Here again, the machining required is expensive and there is the possibility of an omitted or pinched O-ring during assembly.

Because of the wide applicability of rotary type valves and their inherent sealing problems, it has become desirable to develop a positive means for sealing these valves which is relatively inexpensive and does not require precision machining.

SUMMARY OF THE INVENTION

The present invention provides a solution to the problem of leakage within rotary type valves and does not require precision machining. This is accomplished by using a formed stamped metallic sleeve or liner which slips over and firmly engages the rotor. This sleeve has apertures stamped in the periphery thereof which align with the bores provided in the rotor. The inner surface of the sleeve has a thin layer of elastomeric material chemically bonded thereto to provide a seal between the rotor and the sleeve. This layer of elastomeric material terminates in a bead which encircles each aperture provided in the sleeve forming an O-ring configuration about each aperture. This bead provides a positive seal between the rotor and the housing when the rotor bore is aligned with the housing ports and during rotation of the rotor to alter the flow of fluid through the valve. Since the sleeve is stamped and does not require any machining and its use does not require any precision machining of the rotor or the housing, it is relatively inexpensive to use. In addition, inasmuch as the layer of elastomeric material terminates in a bead-like configuration about each aperture provided in the sleeve, there is no need for an additional O-ring about each aperture and thus the possibility of omitting or pinching an O-ring during valve assembly is eliminated.

DESCRIPTION OF THE PREFERRED EMBODIMENT

Figures 4, 5, 6:
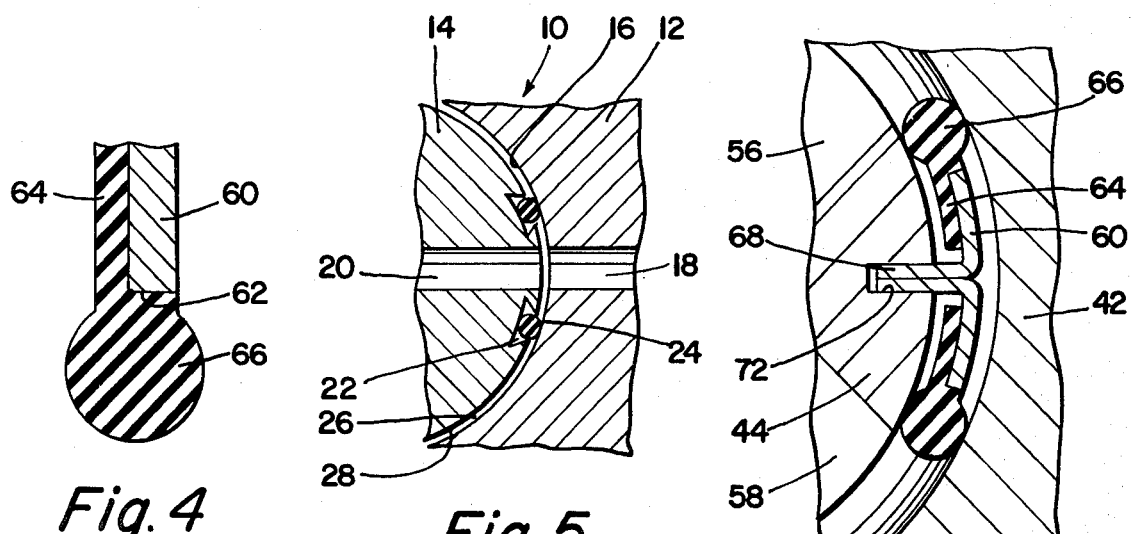
FIG. 4 is an enlarged partial cross-sectional view illustrating the attachment of the elastomeric inner surface of the sealing sleeve to the outer metal sleeve and the formation of the bead shaped section about the apertures provided in the sleeve.
FIG. 5 is an enlarged partial cross-sectional top view of a valve housing and rotor illustrating the machined groove in the rotor and the position of the O-ring in the groove to provide a sealing means in the prior art.
FIG. 6 is an enlarged partial cross-sectional top view of a valve housing and rotor illustrating the attachment thereto of the sealing sleeve made in accordance of the present invention and the firm sealing of the sleeve about the bores provided in the rotor.

Referring now to the drawings, FIG. 5 is an enlarged partial cross-sectional top view of a valve 10 of the prior art. Valve 10 is comprised of a housing 12 and a rotor 14 which has a generally circular configuration and is received in a bore 16 provided in housing 12. Housing 12 has a port 18, which can be either an inlet or an outlet port, provided therein. Rotor 14 has a bore 20 therethrough which is aligned with port 18 to allow passage of the fluid being communicated through valve 10. A dovetail groove 22 is provided in the periphery of the rotor adjacent bore 20. An O-ring 24 is received in groove 22 to provide a sealing means adjacent bore 20 and port 18 to minimize leakage into the area 26 between the outer surface 28 of the rotor 14 and the bore 16 provided in housing 12. Because of the configuration required for groove 22, costly machining is involved. In addition, inasmuch as installation of O-ring 24 in groove 22 is a separate operation, it is possible that the O-ring will be omitted resulting in leakage into area 26 between the housing 12 and rotor 14. Alternatively, the O-ring could be pinched between the rotor 14 and housing 12 hampering the rotation of rotor 14 and damaging the O-ring.

Figure 1:
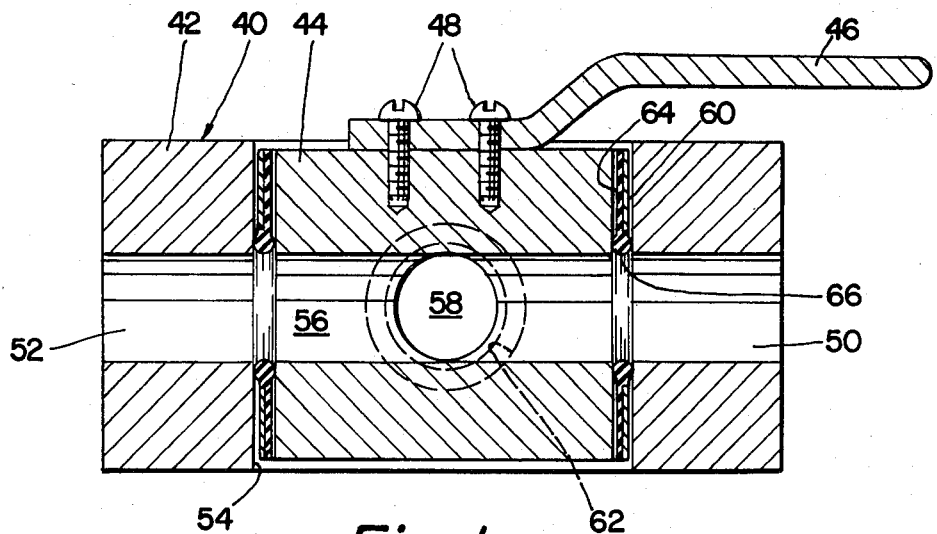
FIG. 1 is a cross-sectional view of a rotary type valve illustrating a sealing sleeve made in accordance with the present invention.

FIG. 1 illustrates a rotary type valve 40 made in accordance with the present invention. Valve 40 is comprised of a valve housing 42, a rotor 44 which is received in the valve housing, and a handle 46 attached to rotor 44 by means of fasteners 48 to assist in rotation thereof. Housing 42 has an inlet port 50 and an outlet port 52. It is understood that inlet port 50 and outlet port 52 can be interchanged without affecting the operation of valve 40. It is further understood that additional ports may be provided in housing 42 making the resulting valve a multiported device. Within housing 42 is a bore 54 which is generally substantially perpendicular to inlet port 50 and outlet port 52.

Figures 2, 3:
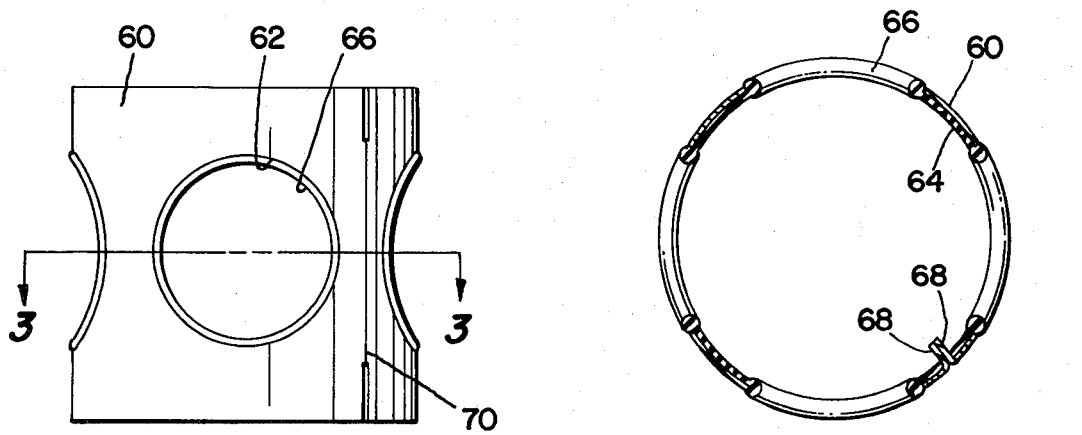
FIG. 2 is a side view of a sealing sleeve made in accordance with the present invention.
FIG. 3 is a top view of the sealing sleeve shown in FIG. 2.

Rotor 44 is of a generally circular configuration and has a outside diameter slightly less than the diameter of bore 54 provided in housing 42. Rotor 44 has a bore 56 passing therethrough having a diameter substantially equal to the diameter of ports 50 and 52. It should be noted that one or more additional bores 58 intersecting bore 56 may be provided in rotor 44. Surrounding rotor 44 is a sealing sleeve 60 having two or more apertures 62 provided in the periphery thereof. During assembly of sleeve 60 over rotor 44, apertures 62 (as shown in FIG. 2) are aligned with the ends of bore 56 so as to permit passage of the fluid therethrough. A sheath 64 of elastomeric material such as nitrile, neoprene, natural rubber, or the like, is provided on the inner surface of sealing sleeve 60 and is chemically bonded thereto. This elastomeric material is formed into a bead 66 around the periphery of each aperture 62 and on the interior thereof. The diameter of bead 66 is such that its outer surface firmly contacts the outer diameter of rotor 44 and bore 54 provided in housing 42 to form a firm seal between rotor 44 and housing 42 about each aperture 62 in sleeve 60.

Sleeve 60 is stamped out of any suitable flat sheet metal stock. During the stamping process, the apertures 62 are punched into the flat metal stock. After stamping, the sheath 64 of elastomeric material is molded onto the sleeve, which is in the flat condition, and is chemically bonded thereto. During the molding process, the bead 66 is formed about each aperture 62. After the molding process has been completed, the sleeve is formed into a cylindrical configuration having its ends turned inwardly forming flanges 68 which abut each other producing a seam 70. A longitudinal recess 72 having a generally square configuration in cross-section is provided in the outer surface of rotor 44 and receives both of the flanges 68, as shown in FIG. 6, preventing relative angular movement of sleeve 60 with respect to rotor 44 as rotor 44 is rotated by means of handle 46 to open or close valve 40.

Since the seal of the present invention is in the form of a sleeve it is easily installed over the rotor and does not require complex machining for securing same to the rotor. In addition, since the beaded sealing surfaces are retained in position by the sleeve, there is no possibility of omitting an O-ring or pinching same during assembly as in the prior art. And lastly, inasmuch as the beaded sealing surfaces are integral with the sleeve, there is no need to machine the rotor or the housing to accomodate same.

It should be noted that the seal of the present invention can also be used in spool type valves where the motion between the spool and seal with respect to the housing is lateral or reciprocating rather than angular. The only modifications that would be required would be the elimination of flanges 68 and mating longitudinal recess 72 and the addition of radially inwardly directed tabs (not shown) at each end of the sleeve to contact the spool preventing any relative movement therebetween.

Variations of the present invention will be apparent to those having ordinary skill in the art and the invention is limited only by the spirit and scope of the following claims:

I claim:

1. A valve comprising a housing having a cylindrical bore wall and a plurality of passages opening into said bore wall, a valve element having a cylindrical valve wall and a plurality of passages opening through said valve wall, said valve wall and said bore wall defining an annular cavity therebetween, said annular cavity having a substantially uniform radial width at all locations, a sealing device disposed in said cavity, said sealing device including a thin metallic cylindrical sleeve member, said sleeve member being of integral one-piece construction and having a substantially uniform radial wall thickness throughout its entire extent, said sleeve member being split along its entire longitudinal extent and having circumferentially facing side surfaces at the location of said split, a plurality of apertures extending radially through said sleeve, each of said apertures being aligned with one of said passages, each of said apertures being defined by a peripheral surface, said sleeve having an inner cylindrical surface and an outer cylindrical surface, one of said cylindrical surfaces being coated with a thin elastomeric sheath over substantially its entire extent, said sheath having a substantially uniform radial wall thickness terminating adjacent said peripheral surfaces; an elastomeric seal located adjacent each of said apertures and extending substantially coextensively with its respective peripheral surface, said elastomeric seals each having a radial wall thickness greater than the combined radial wall thicknesses of said sleeve and said sheath, said elastomeric seals each including one continuous uninterrupted sealing surface sealingly engaging said valve wall and another continuous uninterrupted sealing surface sealingly engaging said bore wall, said sheath and said seals being of integral one-piece construction, said sheath and said sleeve being spaced apart from said valve surface and from said bore surface at all locations away from said split, and said seals being the sole means of maintaining said spaced apart relationship, whereby said sheath and said sleeve do not frictionally engage said valve wall and said bore wall when said valve element is displaced relative to said housing.

* * * * *